No. 836,205. PATENTED NOV. 20, 1906.
C. PEARSON.
SUPPORTING MECHANISM FOR HARVESTER REELS.
APPLICATION FILED MAY 28, 1906.
3 SHEETS—SHEET 1.
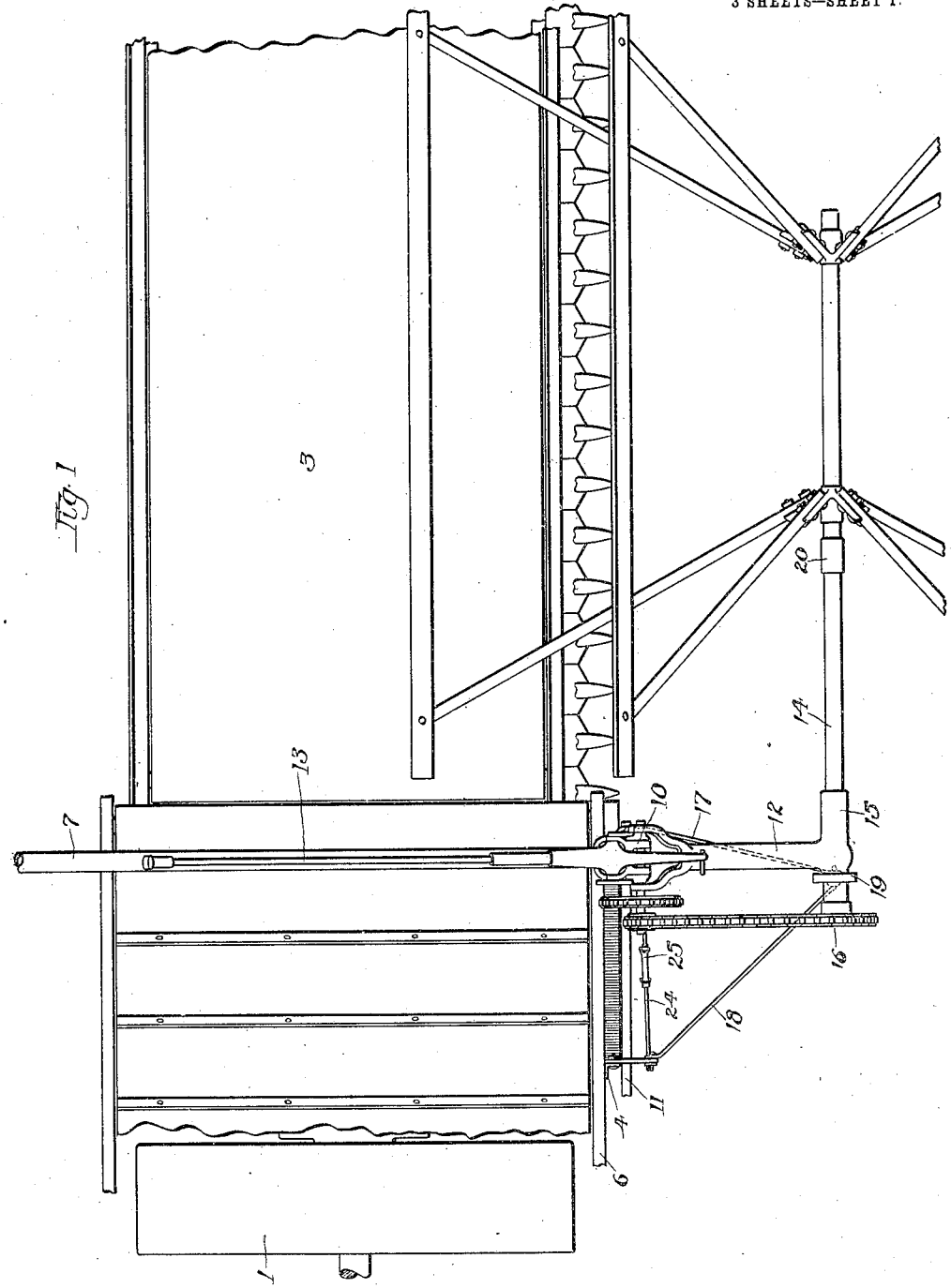
Witnesses:
F. W. Hoffmeister.
J. N. Daggett.
Inventor
Charles Pearson
By E. W. Burgess
Attorney.

No. 836,205. PATENTED NOV. 20, 1906.
C. PEARSON.
SUPPORTING MECHANISM FOR HARVESTER REELS.
APPLICATION FILED MAY 28, 1906.
3 SHEETS—SHEET 2.
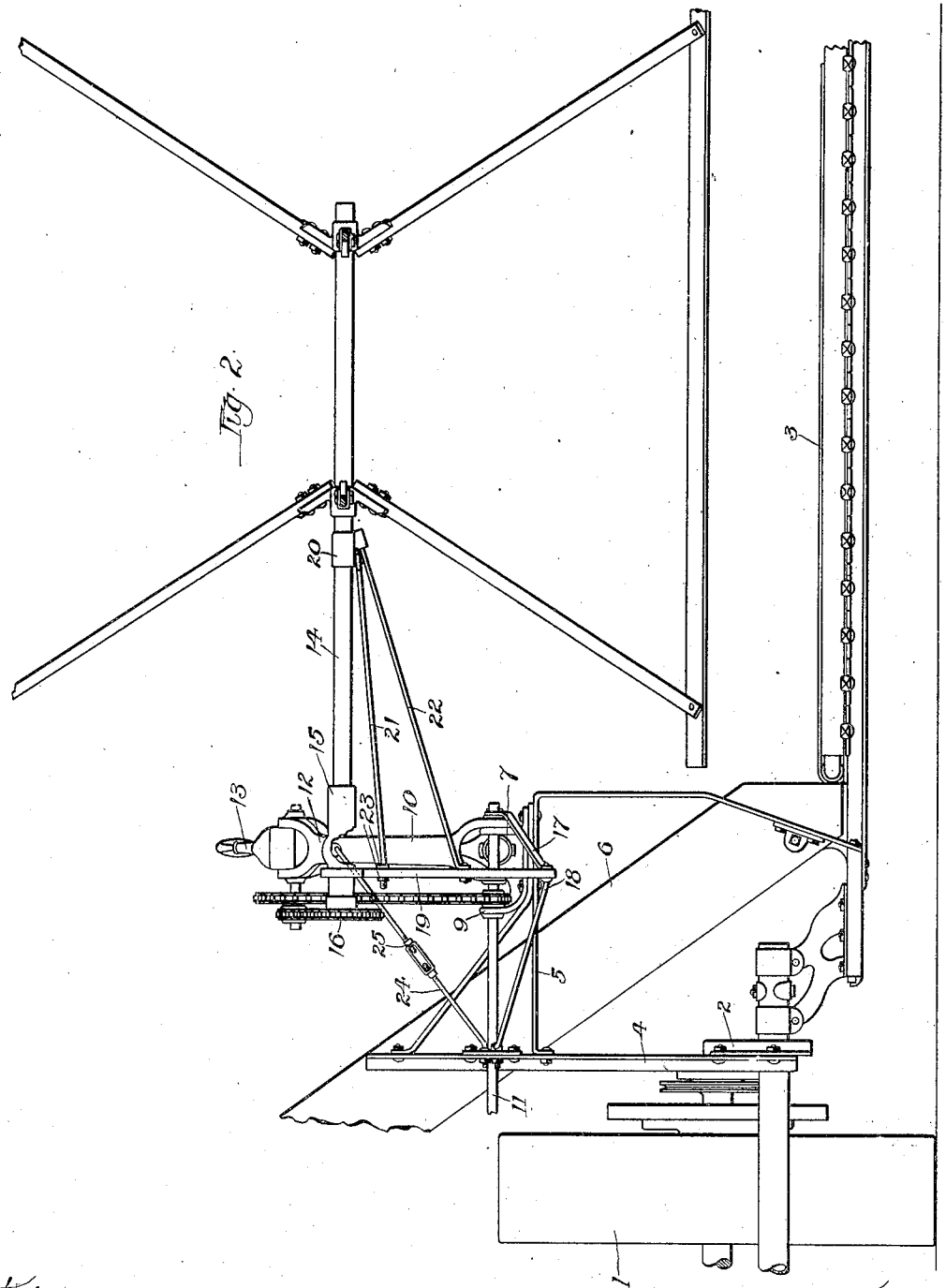
Witnesses:
F. W. Hoffmeister
J. N. Daggett
Inventor
Charles Pearson
By E. W. Burgess
Attorney No. 836,205.
PATENTED NOV. 20, 1906.
C. PEARSON.
SUPPORTING MECHANISM FOR HARVESTER REELS.
APPLICATION FILED MAY 28, 1906.
3 SHEETS—SHEET 3.
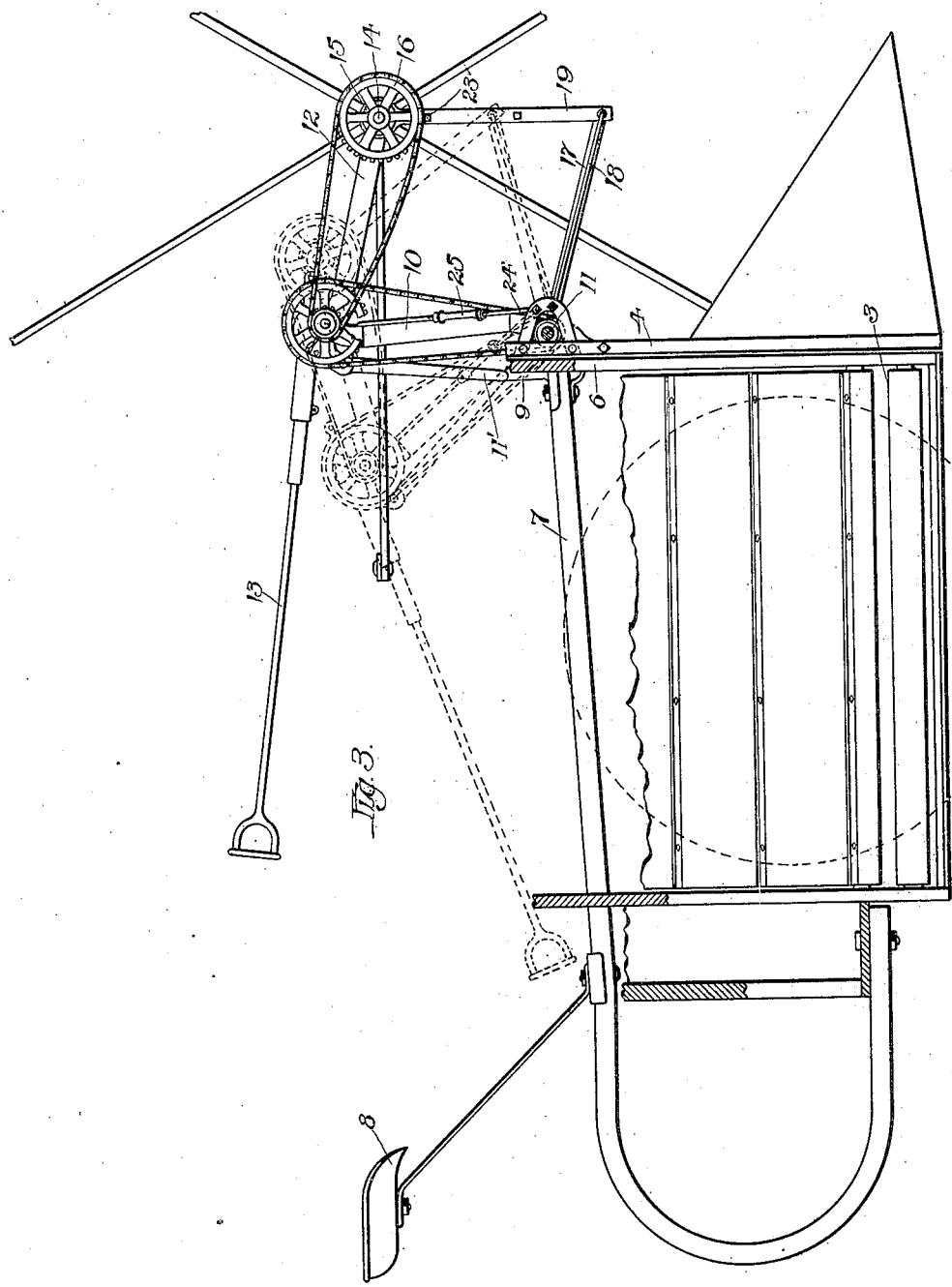
Witnesses:
F.W. Hoffmeister.
V.N. Daggett.
Inventor
Charles Pearson
By E.W. Burgess
Attorney

UNITED STATES PATENT OFFICE.

CHARLES PEARSON, OF CHICAGO, ILLINOIS, ASSIGNOR TO INTERNATIONAL HARVESTER COMPANY, A CORPORATION OF NEW JERSEY.

SUPPORTING MECHANISM FOR HARVESTER-REELS.

No. 836,205.  Specification of Letters Patent.  Patented Nov. 20, 1906.

Application filed May 28, 1906. Serial No. 318,985.

*To all whom it may concern:*

Be it known that I, CHARLES PEARSON, a citizen of the United States, residing at Chicago, in the county of Cook and State of Illinois, have invented certain new and useful Improvements in Supporting Mechanism for Harvester-Reels, of which the following is a specification, reference being had to the accompanying drawings, forming a part thereof.

My invention relates to supporting mechanism for harvester-reels in which the reel is mounted upon supports pivotally connected with the stubbleward end of the frame of the harvester and having the reel overhanging the grain-platform toward its grainward end, the object of my invention being to provide a support of the general character described that will support overhanging reels of unusual length when used in connection with what are commonly called "wide-cut harvesters" in a manner to prevent the grainward end of the reel from sagging toward the cutting mechanism.

I attain this object by the mechanism illustrated in the accompanying drawings, in which—

Figure 1 is a plan view of a part of a harvester in which my invention is embodied. Fig. 2 is a front elevation of Fig. 1, and Fig. 3 is an end elevation of Fig. 1 as seen from stubbleward end of the machine.

Similar reference numerals designate like parts throughout the several views.

1 represents the main supporting and driving wheel of a harvester; 2, a portion of the wheel-frame; 3, a grain-platform; 4, a vertically-arranged frame-piece secured to the wheel-frame; 5 a, supplemental frame-piece having its lower end secured to the front side of the grain-platform and its upper portion extended stubbleward and secured to the vertical member 4, and 6 represents a portion of the elevator-frame at the front side of the machine.

7 is a seat-supporting pipe, and 8 represents a seat suitably mounted thereon.

The primary reel supporting and adjusting mechanism is similar to that shown in patent to J. A. Graham, No. 431,970, July 8, 1890.

9 represents a base-support secured to the seat-supporting pipe and frame member 5.

10 is an upright arm pivoted upon the base-piece by means of a shaft 11, and some distance rearward and at a greater height a brace-arm 11' is pivoted to the same piece. The arm 10 is pivotally connected at its upper end with the horizontally-arranged reel-bearing arm 12, and a hand-lever 13 is connected therewith in a manner to control the movement of the arms, as described in the above-mentioned patent.

14 is the reel-shaft, journaled in a sleeve 15, forming part of the arm 12, and motion is transmitted to the shaft by means of a sprocket-wheel 16, secured thereto, and other motion-transmitting means connecting it with the driving mechanism of the harvester.

As additional means for supporting the reel I provide supplemental arms 17 and 18, extending forward from the axis of the shaft 11 and being substantially equal in length to the horizontal arm 12, the arm 17 being pivotally mounted upon the axis of the shaft 11 and the arm 18 pivotally connected with the vertical frame member 4 near the axis of the shaft 11, the two arms forming a triangular movable supplemental reel-supporting arm arranged approximately parallel with the horizontal arm 12 and pivotally connected therewith by means of a vertical arm 19, that is arranged substantially parallel with the upright arm 10, the upper end of the vertical arm 19 being provided with an eye receiving the stubbleward end of the sleeve 15, in which the reel-shaft is journaled, and having the forward ends angularly-arranged, supplemental arms 17 and 18, pivotally connected with its lower end.

20 represents a sleeve mounted upon the reel-shaft grainward of the sleeve 15 and in which the reel-shaft is journaled, and 21 and 22 are upper and lower tie-rods connected with the sleeve and the vertical arm 19, the lower rod 22 being connected with the member 19 near its lower end and the upper rod 21 near its upper end for the purpose of preventing movement of the sleeve relative to the reel-shaft. The upper rod 21 is adjustably connected with the part 19 by means of the nuts 23 in a manner to raise or lower the outer or grainward end of the reel-shaft to a limited extent in relation to the vertical arms.

As an additional support for the upright arm 10 to prevent it from swinging toward the grainward end of the machine and carrying with it the reel, I provide a tie-rod 24, having its upper end connected with the upper end of the member 10 and extending downward and grainward, secured at its lower end to the vertical frame member 4 near the axis of the shaft 11, and 25 represents a turnbuckle forming a part of the tie-rod and operative in a well-known manner to adjust its length.

In operation the reel is manipulated by means of the hand-lever in the well-known way, the vertical arms 10 and 19 and the horizontal arms 17, 18, and 12 forming a parallelogram pivotally mounted at one corner upon a fixed part of the machine and sustained laterally by the tie-rod 24, and free to swing in a fore-and-aft direction in a manner to adjust the reel in a horizontal plane or in a vertical direction in a manner to adjust it in a vertical plane and the grainward end of the reel prevented from sagging by means of the rods 21 and 22, connected with the sleeve 15 and the forward vertical member of the parallelogram.

What I claim, and desire to secure by Letters Patent, is—

1. A reel-supporting mechanism for harvesters comprising, in combination, two vertically-arranged and parallel arms having their upper and lower ends pivotally connected by means of horizontally-arranged and parallel arms, one of said vertically-arranged arms having its lower end pivotally connected with a fixed part of the machine, a reel-shaft journaled at the upper end of the other vertically-arranged arm and extending grainward thereof, a sleeve loosely mounted on said shaft toward its grainward end, and a brace connection between said sleeve and said last-mentioned arm.

2. A reel-supporting mechanism for harvesters comprising, in combination, two vertically-arranged and parallel arms, having their upper and lower ends pivotally connected by means of horizontally-arranged and parallel arms, one of said vertically-arranged arms having its lower end pivotally connected with a fixed part of the machine, and a tie-rod having its upper end connected with the upper end of said arm and extending downward and stubbleward and having its lower end pivotally connected with a fixed part of the machine and substantially coincident with the axis of movement of said vertical arm, a reel-shaft journaled at the upper end of the other vertically-arranged arm and extending grainward thereof, a sleeve loosely mounted on said shaft toward its grainward end, and a brace connection between said sleeve and said last-mentioned arm.

3. A reel-supporting mechanism for harvesters comprising, in combination, two vertically-arranged and parallel arms, having their opposite ends pivotally connected by means of horizontally-arranged and parallel arms, one of said vertically-arranged arms having its lower end pivotally connected with a fixed part of the machine, a reel-shaft journaled at the upper end of the other vertically-arranged arm and extending grainward thereof, a sleeve loosely mounted on said shaft toward its grainward end, and an adjustable brace connection between said sleeve and said last-mentioned arm.

4. A reel-supporting mechanism for harvesters comprising, in combination, two vertically-arranged and parallel arms, having their opposite ends pivotally connected by means of horizontally-arranged and parallel arms, one of said vertically-arranged arms having its lower end pivotally connected with a fixed part of the machine, a reel-shaft journaled at the upper end of the other vertically-arranged arm and extending grainward thereof, a sleeve loosely mounted on said shaft toward its grainward end, two braces connecting said sleeve with said last-mentioned arm, one of said braces being adjustable lengthwise.

CHARLES PEARSON.

Witnesses:
GEORGE W. FREDENBURG,
RAY PATTISON.